United States Patent
Yoshioka

(10) Patent No.: US 11,260,384 B2
(45) Date of Patent: Mar. 1, 2022

(54) HONEYCOMB FILTER

(71) Applicant: NGK Insulators, Ltd., Nagoya (JP)

(72) Inventor: Fumihiko Yoshioka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/815,488

(22) Filed: Mar. 11, 2020

(65) Prior Publication Data

US 2020/0306738 A1 Oct. 1, 2020

(30) Foreign Application Priority Data

Mar. 29, 2019 (JP) .............................. JP2019-066132

(51) Int. Cl.
*B01J 35/04* (2006.01)
*B01D 53/88* (2006.01)
*C04B 38/00* (2006.01)

(52) U.S. Cl.
CPC ............ *B01J 35/04* (2013.01); *B01D 53/885* (2013.01); *C04B 38/0009* (2013.01); *B01D 2255/9205* (2013.01)

(58) Field of Classification Search
None
See application file for complete search history.

(56) References Cited

U.S. PATENT DOCUMENTS

| | | |
|---|---|---|
| 2004/0258582 A1 | 12/2004 | Miwa et al. |
| 2013/0247525 A1 | 9/2013 | Tsuchiya et al. |
| 2014/0290196 A1* | 10/2014 | Tsuchiya ............ C04B 38/0012 55/523 |

FOREIGN PATENT DOCUMENTS

| | | | |
|---|---|---|---|
| JP | 2003214140 A | * | 7/2003 |
| JP | 2008-100408 A1 | | 5/2008 |
| JP | 2010-221189 A1 | | 10/2010 |
| JP | 2013-223856 A1 | | 10/2013 |
| JP | 2015-164712 A1 | | 9/2015 |

OTHER PUBLICATIONS

Suzuki et al., machine translation of JP 2003-214140 Abstract and Description, Jul. 30, 2003 (Year: 2003).*
U.S. Appl. No. 16/815,523, filed Mar. 11, 2020, Fumihiko Yoshioka.
(Continued)

*Primary Examiner* — Mary I Omori
(74) *Attorney, Agent, or Firm* — Burr & Brown, PLLC

(57) ABSTRACT

A honeycomb filter includes a pillar-shaped honeycomb structure having porous partition walls provided, surrounding a plurality of cells which serve as fluid through channels extending from an inflow end face to an outflow end face, and a porous plugging portion provided either at an end on the inflow end face or the outflow end face of the cells, wherein the plugging portion is composed of a porous material, the honeycomb structure has a central region and a circumferential region, and a ratio of an area of the circumferential region with respect to that of the central region ranges from 0.1 to 0.5, porosity of a central plugging portion in the central region is lower than that of a circumferential plugging portion in the circumferential region, and the porosity of the central plugging portions ranges from 60% to 68%, and that of the circumferential plugging portions ranges from 70% to 85%.

9 Claims, 4 Drawing Sheets

(56) References Cited

OTHER PUBLICATIONS

U.S. Appl. No. 16/815,549, filed Mar. 11, 2020, Fumihiko Yoshioka.
U.S. Appl. No. 16/815,574, filed Mar. 11, 2020, Fumihiko Yoshioka.
Chinese Office Action, Chinese Application No. 202010181251.X, dated Aug. 4, 2021 (6 pages).

* cited by examiner

HONEYCOMB FILTER

The present application is an application based on JP 2019-066132 filed on Mar. 29, 2019 with Japan Patent Office, the entire contents of which are incorporated herein by reference.

BACKGROUND OF THE INVENTION

Field of the Invention

The present invention relates to a honeycomb filter. More particularly, the present invention relates to a honeycomb filter which effectively restrains plugging portions, which are provided to plug the open ends of cells, from falling off from the cells, and which exhibits high erosion resistance and high thermal shock resistance.

Description of the Related Art

Hitherto, as a filter adapted to trap particulate matter in an exhaust gas emitted from an internal combustion engine, such as a diesel engine, or a device adapted to purify toxic gas components, such as CO, HC, and NOx, there has been known a honeycomb filter using a honeycomb structure (refer to Patent Documents 1 to 4). The honeycomb structure has partition walls formed of a porous ceramic, such as cordierite or silicon carbide, and includes a plurality of cells defined by the partition walls. In the honeycomb filter, the foregoing honeycomb structure is provided with plugging portions that alternately plug the open ends on the inflow end face side of the plurality of cells and the open ends on the outflow end face side thereof. In other words, the honeycomb filter has a structure in which inflow cells having the inflow end face side open and the outflow end face side plugged and outflow cells having the inflow end face side plugged and the outflow end face side open are arranged alternately with the partition walls placed therebetween. Further, in the honeycomb filter, the porous partition walls of the honeycomb structure function as filters that trap the particulate matter in an exhaust gas. Hereinafter, the particulate matter contained in an exhaust gas may be referred to as "PM." The "PM" is an abbreviation of "particulate matter."

In recent years, a honeycomb filter for purifying an exhaust gas emitted from an engine of an automobile or the like has been required to achieve a reduction in pressure loss mainly for improving automobile fuel economy performance. As one of the measures for reducing pressure loss, studies have been conducted on "thinner walls" to reduce the thickness of the partition walls of a honeycomb structure and "higher porosity" to further enhance the porosity of partition walls as compared with the conventional one.

[Patent Document 1] JP-A-2015-164712
[Patent Document 2] JP-A-2013-223856
[Patent Document 3] JP-A-2010-221189
[Patent Document 4] JP-A-2008-100408

SUMMARY OF THE INVENTION

Conventional honeycomb filters pose a problem in that plugging portions easily fall off from the ends of cells. There has been another problem in that the plugging portions are damaged due to various types of stresses applied to the honeycomb filters even if the plugged portions do not fall off.

For example, when a honeycomb filter is used as a filter for purifying an exhaust gas, the honeycomb filter is sometimes used by being housed in a can body, such as a metal case. Housing a honeycomb filter in a can body, such as a metal case, may be referred to as canning. When canning a honeycomb filter, the honeycomb filter is held in a can body by applying a surface pressure to the circumferential surface of the honeycomb filter through the intermediary of a holding material, such as a mat. Even when such canning is performed, plugging portions fall off from the ends of cells or the plugging portions are damaged in some cases.

There has been yet another problem in that, if foreign matters, such as metal particles from an engine or an exhaust pipe, come together with an exhaust gas flow, and the foreign matters collide with the plugging portions of the honeycomb filter, then the plugging portions collided by the foreign matters wear. Especially in the case of recent plugging portions designed for higher porosity, all plugging portion are scraped off by foreign matters and the plugging portions are eventually lost from the open ends of cells in some cases. This has sometimes led to the loss of the filtering function of the honeycomb filter. In the following description, the wear or scraping of plugging portions or the like attributable to foreign matter coming together with an exhaust gas flow may be referred to as "erosion."

Further, a honeycomb filter is used in an environment in which the honeycomb filter is exposed to a hot exhaust gas, so that the honeycomb filter inevitably develops a temperature gradient, thus generating a thermal stress. Further, continued use of a honeycomb filter causes PM to accumulate on the surfaces of partition walls, resulting in an increase in the pressure loss of the honeycomb filter in some cases. For this reason, a honeycomb filter is sometimes subjected, on a regular basis, to regeneration processing for burning away the PM accumulated on the partition walls. A honeycomb filter sometimes develops a crack or the like due to the thermal stress caused by the temperature gradient or the combustion of PM described above. Hence, there has been a demand for developing a honeycomb filter featuring higher thermal shock resistance.

The present invention has been made in view of the problems with the prior arts described above. The present invention provides a honeycomb filter which effectively restrains plugging portions, which are provided to plug the open ends of cells, from falling off from the cells, and which exhibits high erosion resistance and high thermal shock resistance.

According to the present invention, a honeycomb filter described below is provided.

According to a first aspect of the present invention, a honeycomb filter is provided including:

a pillar-shaped honeycomb structure having porous partition walls provided, surrounding a plurality of cells which serve as fluid through channels extending from an inflow end face to an outflow end face; and porous plugging portions provided either at the ends on the inflow end face side of the cells or at the ends on the outflow end face side of the cells, wherein the plugging portion is composed of a porous material, the honeycomb structure has a central region that includes a center of gravity in a section orthogonal to a direction in which the cells extend, and a circumferential region on a farther circumferential side from the central region, and has S2/S1, which denotes a ratio of an area S2 of the circumferential region with respect to an area S1 of the central region, ranging from 0.1 to 0.5, porosity P1 of a central plugging portion, which is the plugging portion existing in the central region is lower than porosity P2 of a circumferential plugging portion, which is the plugging portion existing in the circumferential region, and the porosity P1 of the central plugging portions ranges from 60% to 68%, and the porosity P2 of the circumferential plugging portions ranges from 70% to 85%.

According to a second aspect of the present invention, the honeycomb filter described in the foregoing first aspect is provided, including:

a plurality of the central plugging portions and the circumferential plugging portions arranged from a center toward a circumference in a radial direction of the section of the honeycomb structure, wherein the central plugging portions and the circumferential plugging portions are configured such that the porosity of each of the central plugging portions and the circumferential plugging portions, which are arranged in order toward the circumference, increase in steps from the central plugging portions provided closer to a central side in the radial direction of the section.

According to a third aspect of the present invention, the honeycomb filter described in the foregoing first or second aspects is provided, wherein a cell structure of the honeycomb structure is the same in the central region and the circumferential region.

According to a fourth aspect of the present invention, the honeycomb filter described in any one of the foregoing first to third aspects is provided, wherein the porosity of the partition walls ranges from 40% to 70%.

The honeycomb filter in accordance with the present invention provides an advantage of effectively restraining the plugging portions provided to plug the open ends of cells from falling off from the cells and an advantage of exhibiting high erosion resistance and high thermal shock resistance. The honeycomb filter according to the present invention is particularly effective as a honeycomb filter provided with a honeycomb structure having higher porosity. More specifically, the porosity P1 of the central plugging portions is lower than the porosity P2 of the circumferential plugging portions, so that the ratio between a Young's modulus E1 of the circumferential plugging portions having relatively higher porosity and a Young's modulus E2 of the honeycomb structure (E1/E2) becomes small, thus making it possible to further effectively restrain the circumferential plugging portions from falling off. In addition, the central plugging portions having relatively lower porosity improve the strength thereof, leading to high erosion resistance. Further, the central plugging portions having the relatively lower porosity increase the heat capacity of the central region of the honeycomb structure, thus reducing the possibility of damage to the honeycomb filter in the regeneration processing for burning away the PM trapped on the partition walls.

DESCRIPTION OF THE PREFERRED EMBODIMENTS

The following will describe embodiments of the present invention; however, the present invention is not limited to the following embodiments. Therefore, it should be understood that those created by adding changes, improvements and the like to the following embodiments, as appropriate, on the basis of the common knowledge of one skilled in the art without departing from the spirit of the present invention are also covered by the scope of the present invention.

(1) Honeycomb Filter

Figure 1:
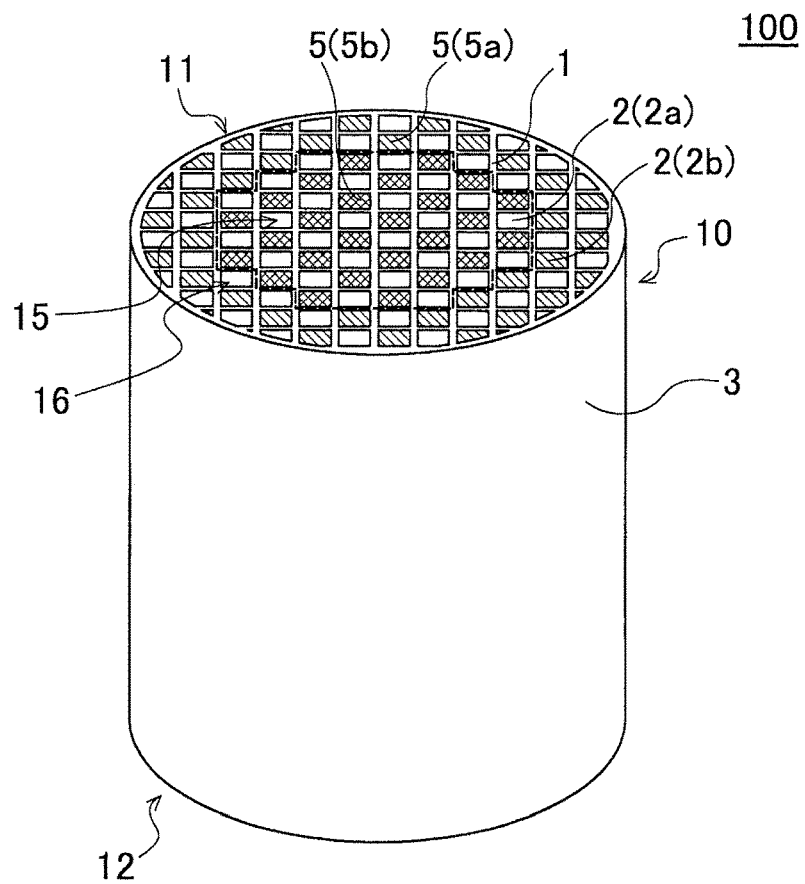
FIG. 1 is a perspective view schematically showing an embodiment of a honeycomb filter in accordance with the present invention.
Figure 2:
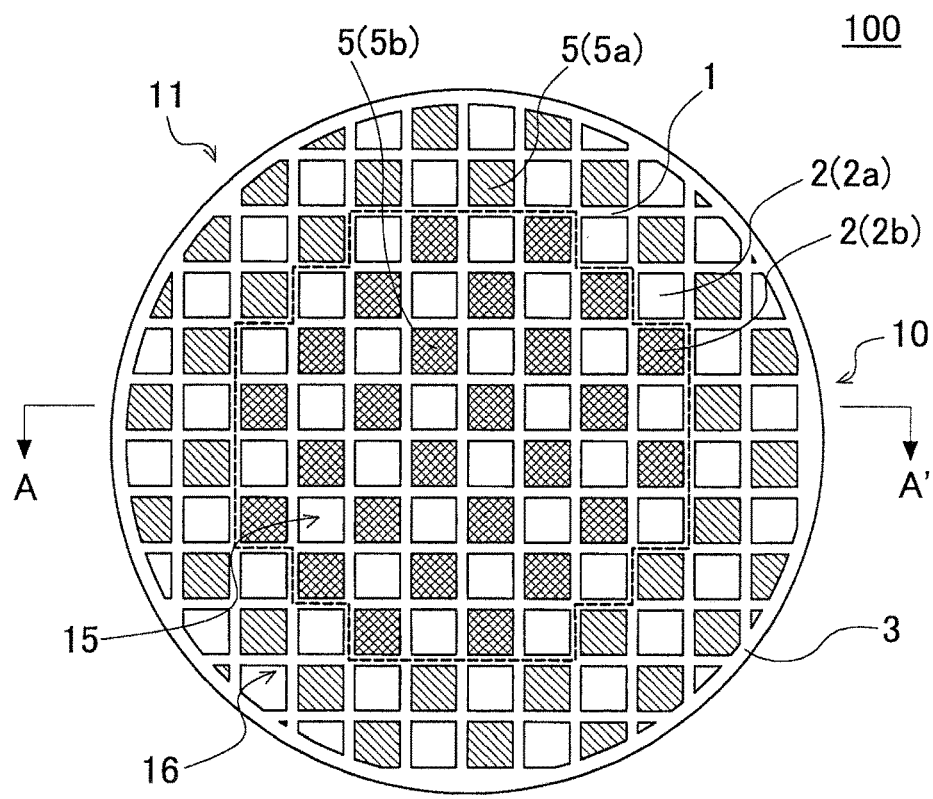
FIG. 2 is a plan view showing the inflow end face side of the honeycomb filter shown in FIG. 1.
Figure 3:
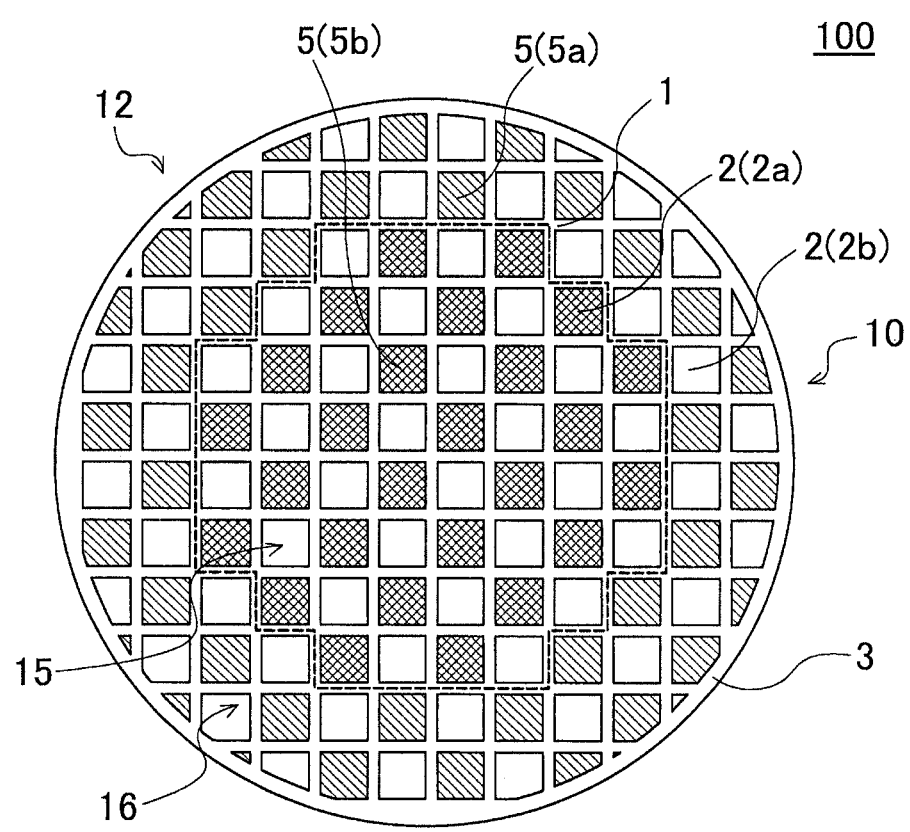
FIG. 3 is a plan view showing the outflow end face side of the honeycomb filter shown in FIG. 1.
Figure 4:
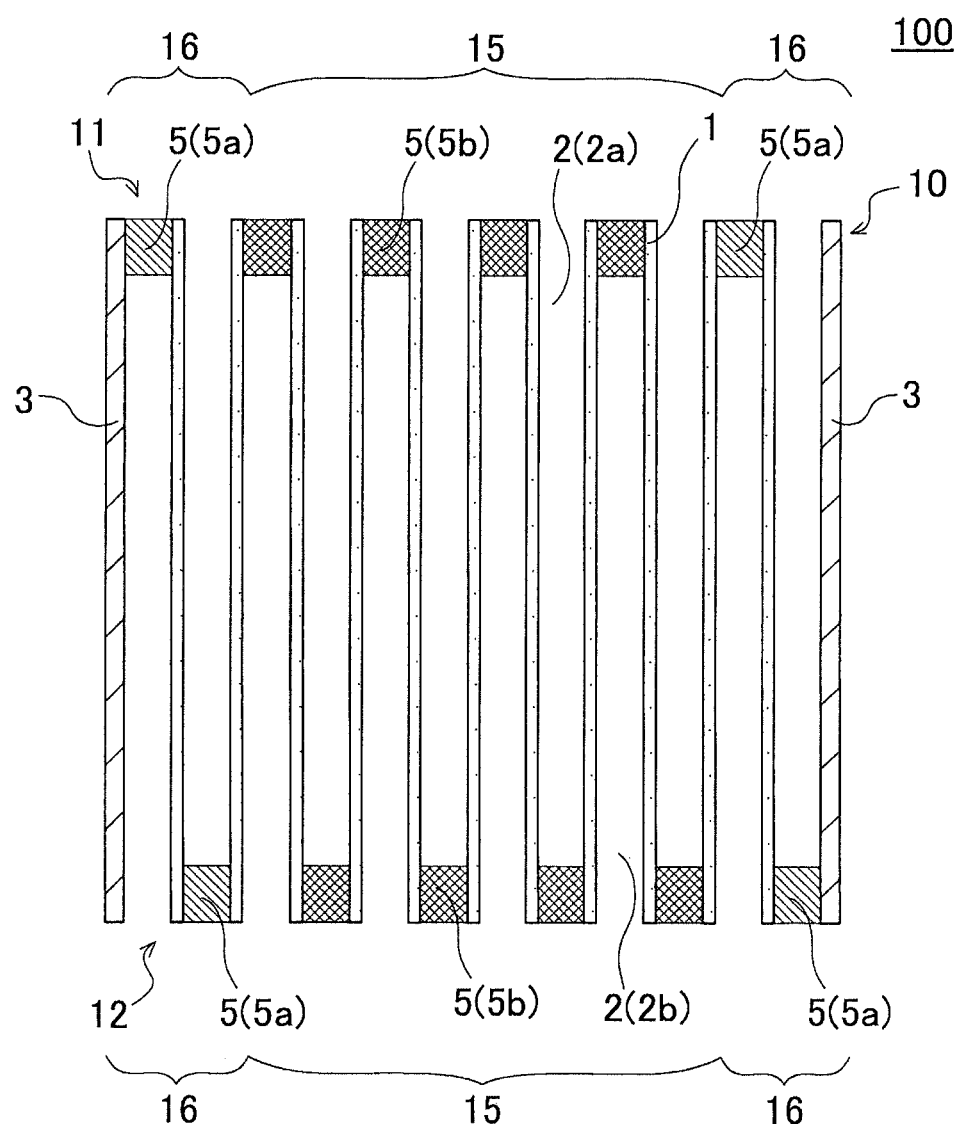
FIG. 4 is a sectional view schematically showing the section taken along A-A' of FIG. 2.

An embodiment of the honeycomb filter in accordance with the present invention is a honeycomb filter 100 shown in FIG. 1 to FIG. 4. FIG. 1 is a perspective view schematically showing the embodiment of the honeycomb filter in accordance with the present invention. FIG. 2 is a plan view of the inflow end face side of the honeycomb filter shown in FIG. 1. FIG. 3 is a plan view of the outflow end face side of the honeycomb filter shown in FIG. 1. FIG. 4 is a sectional view schematically showing a section taken along A-A' of FIG. 2.

As shown in FIG. 1 to FIG. 4, the honeycomb filter 100 includes a honeycomb structure 10 and plugging portions 5. The honeycomb structure 10 has porous partition walls 1 placed, surrounding a plurality of cells 2 which serve as fluid through channels extending from an inflow end face 11 to an outflow end face 12. The honeycomb structure 10 is a pillar-shaped structure having the inflow end face 11 and the outflow end face 12 as both end faces thereof. In the honeycomb filter 100 of the present embodiment, the honeycomb structure 10 further has a circumferential wall 3 provided, encompassing the partition walls 1 on the circumferential side surface thereof.

The plugging portions 5 are provided either at the ends on the inflow end face 11 side of the cells 2 or at the ends on the outflow end face 12 side of the cells 2 to plug the open ends of the cells 2. The plugging portions 5 are porous substances (i.e. porous bodies) composed of a porous material. In the honeycomb filter 100 shown in FIG. 1 to FIG. 4, the predetermined cells 2 having the plugging portions 5 provided at the ends on the inflow end face 11 side and the residual cells 2 having the plugging portions 5 provided at the ends on the outflow end face 12 side are alternately arranged with the partition walls 1 placed therebetween. In the following description, the cells 2 having the plugging portions 5 provided at the ends on the inflow end face 11 side may be referred to as "the outflow cells 2b." The cells 2 having the plugging portions 5 provided at the ends on the outflow end face 12 side may be referred to as "the inflow cells 2a."

In the honeycomb filter 100, the honeycomb structure 10 has a central region 15, which includes the center of gravity in a section orthogonal to the extending direction of the cells 2, and a circumferential region 16 located on the circumferential side with respect to the central region 15. Hereinafter, "the section orthogonal to the extending direction of the cells 2 of the honeycomb structure 10" may be referred to simply as "the section of the honeycomb structure 10". Further, "the center of gravity" of the section of the honeycomb structure 10 refers to the center of gravity of the section in a geometrical sense (in other words, the geometrical center). In the honeycomb filter 100, the ratio of an area S2 of the circumferential region 16 with respect to an area S1 of the central region 15, i.e. S2/S1, ranges from 0.1 to 0.5. Hereinafter, in the present specification, "the ratio of the area S2 of the circumferential region 16 with respect to the area S1 of the central region 15" may be referred to as "the area ratio (S2/S1)."

The honeycomb filter 100 is configured such that porosity P1 of central plugging portions 5b, which are plugging portions 5 existing in the central region 15, is lower than porosity P2 of circumferential plugging portions 5a, which are plugging portions 5 existing in the circumferential region 16. With this configuration, the honeycomb filter 100 provides an effect for effectively restraining the plugging portions 5 from falling off from the cells 2 and also provides an effect for achieving higher erosion resistance and higher thermal shock resistance. The honeycomb filter 100 is effectively used particularly in the honeycomb filter 100 provided with the honeycomb structure 10 having higher porosity. More specifically, the porosity P1 of the central plugging portions 5b is lower than the porosity P2 of the circumferential plugging portions 5a, so that the ratio between a Young's modulus E1 of the circumferential plugging portions 5a and a Young's modulus E2 of the honeycomb structure 10 (E1/E2) becomes smaller. The smaller ratio of the Young's modulus (E1/E2) makes it possible to further effectively restrain the circumferential plugging portions 5a from falling off. In addition, the central plugging portions 5b having the relatively lower porosity improve the strength thereof, leading to high erosion resistance. Further, the central plugging portions 5b having the relatively lower porosity increase the heat capacity of the central region 15 of the honeycomb structure 10, thus reducing the possibility of damage to the honeycomb filter 100 during the regeneration processing for burning away the PM trapped on the partition walls 1.

If the honeycomb filter 100 is configured such that the porosity P1 of the central plugging portions 5b existing in the central region 15 is equal to or higher than the porosity P2 of the circumferential plugging portions 5a existing in the circumferential region 16, then the foregoing effects will not be obtained. Hereinafter, the central plugging portions 5b existing in the central region 15 may be referred to simply as "the central plugging portions 5b of the central region 15." Further, the circumferential plugging portions 5a existing in the circumferential region 16 may be referred to as "the circumferential plugging portions 5a of the circumferential region 16."

There is no particular restriction on the shape of the central region 15 insofar as the central region 15 is a region that includes "the center of gravity" of the section of the honeycomb structure 10. The central region 15 is the region in which the porosity P1 of the plugging portions 5 ranges from 60% to 68% and in which the central plugging portions 5b exist. Further, the circumferential region 16 is a region in which the porosity of the plugging portions 5 ranges from 70% to 85% and in which the circumferential plugging portions 5a exist. The central region 15 may have, for example, the center of gravity at the same position as that of the honeycomb structure 10, and may be shaped similarly to or differently from the circumferential shape of the honeycomb structure 10. Shaping the central region 15 similarly to the circumferential shape of the honeycomb structure 10 causes the foregoing effects to be further effectively exhibited.

The porosity of the plugging portions 5 can be measured as described below. A portion equivalent to one cell that includes one plugging portion 5 and the partition walls 1 around the plugging portion 5 is cut out from the honeycomb filter 100 and processed to remove the partition walls 1 around the plugging portion 5. Thereafter, the mass of the plugging portion 5 is measured, and the porosity is calculated on the basis of the measured mass and the true density of a plugging material constituting the plugging portion 5. When measuring the porosity of the plugging portion 5, the porosity of all the plugging portions 5 provided at the ends of the cells 2 of the honeycomb structure 10 are to be measured.

By measuring the porosity of the plugging portions 5 as described above, the central region 15 and the circumferential region 16 can be defined. More specifically, the region where there are the central plugging portions 5b, which are the plugging portions 5 having the porosity thereof ranging from 60% to 68% can be defined as the central region 15. Further, the region where there are the circumferential plugging portions 5a, which are the plugging portions 5 having the porosity thereof ranging from 70% to 85% can be defined as the circumferential region 16. In the honeycomb filter 100 of the present embodiment, the plugging portions 5 that plug the open ends of the cells 2 are preferably either the central plugging portions 5b that have the porosity ranging from 60% to 68% or the circumferential plugging portions 5a that have the porosity ranging from 70% to 85%.

It is not preferable that the area ratio (S2/S1), which is the ratio of the area S2 of the circumferential region 16 with respect to the area S1 of the central region 15, be below 0.1 because of the possibility of the plugging portions 5 falling off from the cells 2. Further, in terms of thermal shock resistance and erosion, it is not preferable that the area ratio (S2/S1) exceed 0.5. The area ratio (S2/S1) preferably ranges from 0.2 to 0.4.

The porosity P1 of the central plugging portions 5b ranges from 60% to 68%, preferably ranges from 60% to 67%, and more preferably ranges from 60% to 65%. It is not preferable that the porosity P1 of the central plugging portions 5b be below 60% in terms of the purifying performance after catalyst coating. It is not preferable that the porosity P1 of the central plugging portions 5b exceed 68% in terms of erosion.

The porosity P2 of the circumferential plugging portions 5a ranges from 70% to 85%, preferably ranges from 75% to 85%, and more preferably ranges from 80% to 85%. It is not preferable that the porosity P2 of the circumferential plugging portions 5a be below 70% because of the possibility of the plugging portions 5 falling off from the cells 2. It is not preferable that the porosity P2 of the circumferential plugging portions 5a exceed 85% in terms of isostatic strength, which is the strength of the filter itself.

Figure 5:
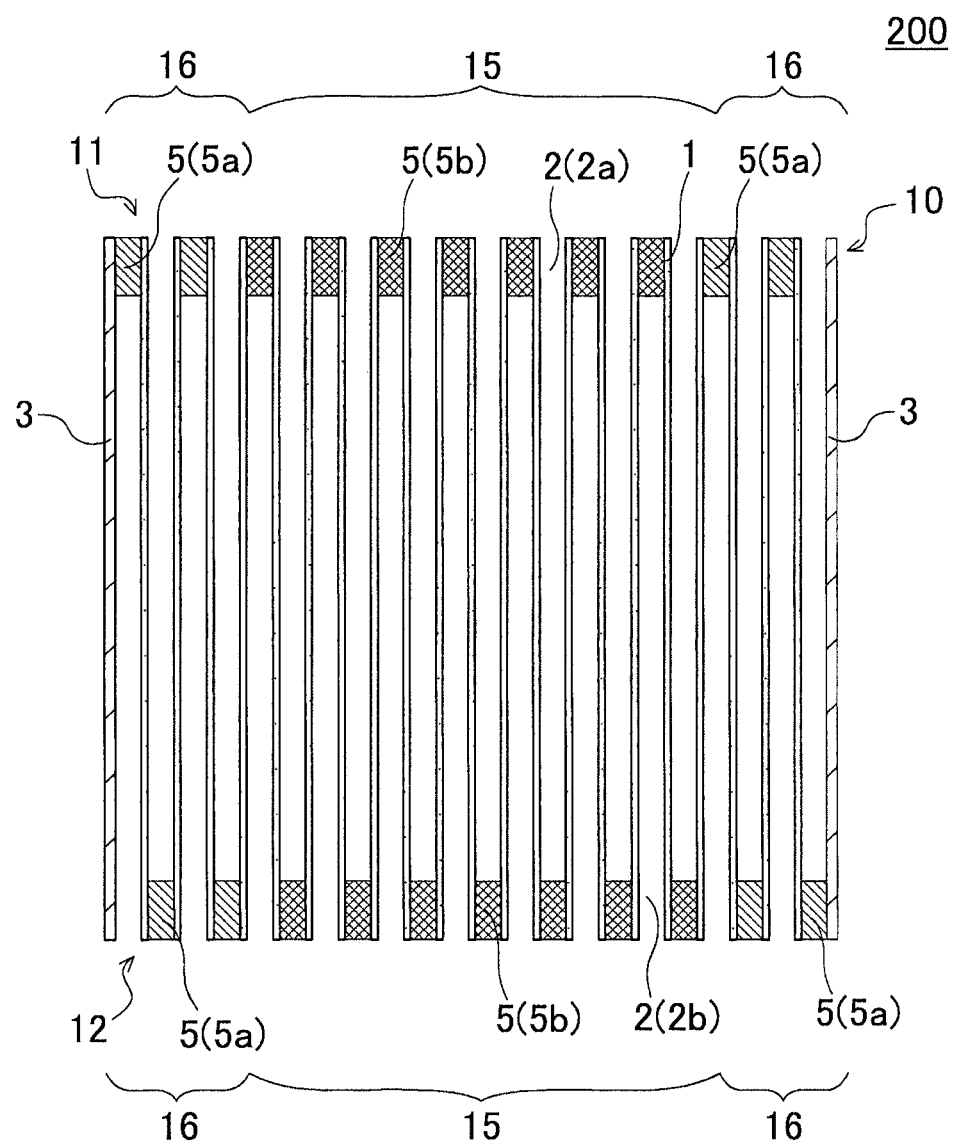
FIG. 5 is a sectional view schematically showing another embodiment of the honeycomb filter in accordance with the present invention.

The honeycomb filter 100 has a plurality of central plugging portions 5b and circumferential plugging portions 5a arranged toward the circumference from the center in the radial direction of the section of the honeycomb structure 10. The honeycomb filter 100 is configured such that the value of the porosity P1 of the central plugging portions 5b existing in the central region 15 is substantially constant and the value of the porosity P2 of the circumferential plugging portions 5a existing in the circumferential region 16 is substantially constant. However, the value of the porosity P1 of the central plugging portions 5b in the central region 15 may vary within the central region 15. Further, the value of the porosity P2 of the circumferential plugging portions 5a in the circumferential region 16 may vary within the circumferential region 16. For example, as with a honeycomb filter 200 shown in FIG. 5, the central plugging portions 5b and the circumferential plugging portions 5a may be configured as described below. The central plugging portions 5b and the circumferential plugging portions 5a may be configured such that the porosity of each of the central plugging portions 5b and the porosity of the circumferential plugging portions 5a, which are arranged in order toward the circumference, increase in steps from the central plugging portions 5b provided closer to the center in the radial direction of the section. In other words, the honeycomb filter 200 shown in FIG. 5 is configured such that the porosity of each of the plugging portions 5 increases in steps as the distance of the plugging portions 5 from the center of the section of the honeycomb structure 10 increases toward the circumference. The honeycomb filter 200 shown in FIG. 5 is preferable in terms of the purifying performance after the catalyst coating. FIG. 5 is a sectional view schematically showing another embodiment of the honeycomb filter in accordance with the present invention. In the honeycomb filter 200 shown in FIG. 5, the like constituent elements as those of the honeycomb filter 100 shown in FIG. 1 to FIG. 4 will be assigned like reference numerals and the detailed descriptions thereof will be omitted.

In the honeycomb filter 200 shown in FIG. 5 also, porosity P1 of central plugging portions 5b preferably ranges from 60% to 68%, and porosity P2 of circumferential plugging portions 5a preferably ranges from 70% to 85%.

The area S1 of the central region 15 and the area S2 of the circumferential region 16 of the honeycomb filter 100 shown in FIG. 1 to FIG. 4 can be determined according to, for example, the following method. First, the porosity of each of the plugging portions 5 on the inflow end face 11 side and on the outflow end face 12 side of the honeycomb filter 100 is calculated from the mass thereof according to the foregoing method, and the boundary between the central plugging portions Sb and the circumferential plugging portions 5a is identified. The boundary between the central plugging portions Sb and the circumferential plugging portions 5a provides the boundary between the central region 15 and the circumferential region 16 in a plane orthogonal to the extending direction of the cells 2 of the honeycomb structure 10. The area from a surface of each of the partition walls 1 to a position that is half the thickness of the partition wall 1 is regarded as the boundary in the partition walls 1 surrounding the central plugging portions 5b on the outermost circumference of the central region 15, and the area on the inner side of the boundary is defined as the area S1. Further, the area S2 is calculated on the basis of the difference between the area of the plane orthogonal to the extending direction of the cells 2 of the honeycomb structure 10, and the area S1.

There is no particular restriction on the extending-direction length of the cell 2 of each of the plugging portions 5. For example, the extending-direction length of the cell 2 of each of the plugging portions 5 preferably ranges from 3 mm to 9 mm, and more preferably ranges from 3 mm to 7 mm. It is not preferable that the length of the plugging portions 5 be below 3 mm, because the plugging portions 5 sometimes fall off easily if the inflow end face 11 of the honeycomb filter 100 is gouged or chipped. It is not preferable that the length of the plugging portions 5 exceed 9 mm, because the area through which a gas passes decreases, leading to an increase in pressure loss.

In the plugging portions 5, which include the central plugging portions 5b and the circumferential plugging portions 5a, preferably, the value of the porosity is substantially constant in the extending direction of the cell 2 for each of the plugging portions 5. More specifically, each of the plugging portions 5 are preferably composed of a porous material having substantially the same porosity as a whole rather than locally increasing or decreasing the porosity by, for example, applying a glaze or the like to the surface on the inflow end face 11 side or the outflow end face 12 side.

In the honeycomb structure 10, porosity P3 of the partition walls 1 preferably ranges from 40% to 70%, and more preferably ranges from 45% to 65%. The honeycomb filter 100 exhibits further marked effect when using the honeycomb structure 10 with high porosity, the porosity P3 of the partition walls 1 ranging from 45% to 65%. The porosity P3 of the partition walls 1 denotes a value measured by the mercury press-in method. The porosity P3 of the partition walls 1 can be measured by using, for example, Micromeritics' AutoPore 9500 (trade name). A part of the partition walls 1 is cut out from the honeycomb structure 10 to obtain a test piece, and the measurement of the porosity P3 of the partition walls 1 can be performed by using the test piece obtained as described above. The porosity P3 of the partition walls 1 preferably has a constant value in the entire honeycomb structure 10. For example, the absolute value of the difference between a maximum value and a minimum value of the porosity P3 of the partition walls 1 is preferably 5% or less.

In the honeycomb structure 10, the thickness of the partition walls 1 preferably ranges from 0.15 mm to 0.30 mm, and more preferably ranges from 0.15 mm to 0.25 mm, and particularly preferably ranges from 0.20 mm to 0.25 mm. The thickness of the partition walls 1 can be measured by using, for example, a scanning electron microscope or a microscope. If the thickness of the partition walls 1 is below 0.15 mm, then a sufficient strength may not be obtained. On the other hand, if the thickness of the partition walls 1 exceeds 0.30 mm, then the pressure loss of the honeycomb filter 100 may increase.

There is no particular restriction on the shapes of the cells 2 defined by the partition walls 1. For example, the shapes of the cells 2 in the section that is orthogonal to the extending direction of the cells 2 may be polygonal, circular, elliptical or the like. A polygonal shape may be triangular, quadrangular, pentagonal, hexagonal, octagonal or the like. The shapes of the cells 2 are preferably triangular, quadrangular, pentagonal, hexagonal or octagonal. Further, regarding the shapes of the cells 2, all the cells 2 may have the same shape or different shapes. For example, although not shown, quadrangular cells and octagonal cells may be mixed. Further, regarding the sizes of the cells 2, all the cells 2 may have the same size or different sizes. For example, although not shown, among the plurality of cells, some cells may be larger and some other cells may be relatively smaller. In the present invention, the term "cells" means the spaces surrounded by the partition walls.

In the honeycomb filter 100, the cell structure of the honeycomb structure 10 is preferably the same in the central region 15 and the circumferential region 16. This configuration causes a gas to evenly flow, so that the configuration is preferable in terms of pressure loss. The cell structure means the structure of the cells 2 in the honeycomb structure 10, including the thickness of the partition walls, the shapes of the cells 2, the cell density, and the like.

In the honeycomb structure 10, the cell density of the cells 2 defined by the partition walls 1 preferably ranges from 27 to 51 cells/cm$^2$ and more preferably ranges from 31 to 47 cells/cm$^2$. This configuration makes it possible to suppress an increase in pressure loss while maintaining the PM trapping performance of the honeycomb filter 100.

The circumferential wall 3 of the honeycomb structure 10 may be configured integrally with the partition walls 1 or may be a circumferential coat layer formed by applying a circumferential coating material, encompassing the partition walls 1. Although not shown, the circumferential coat layer can be provided on the circumferential side of the partition walls after the partition walls and the circumferential wall are integrally formed and then the formed circumferential wall is removed by a publicly known method, such as grinding, in a manufacturing process.

There is no particular restriction on the shape of the honeycomb structure 10. The honeycomb structure 10 may be pillar-shaped, the shapes of the inflow end face 11 and the outflow end face 12 being circular, elliptical, polygonal or the like.

There is no particular restriction on the size of the honeycomb structure 10, e.g. the length from the inflow end face 11 to the outflow end face 12 and the size of the section that is orthogonal to the extending direction of the cells 2 of the honeycomb structure 10. Each size may be selected as appropriate such that optimum purifying performance is obtained when the honeycomb filter 100 is used as a filter for purifying an exhaust gas. For example, the length from the inflow end face 11 to the outflow end face 12 of the honeycomb structure 10 preferably ranges from 90 mm to 160 mm and more preferably ranges from 120 mm to 140 mm. Further, the area of the section that is orthogonal to the extending direction of the cells 2 of the honeycomb structure 10 preferably ranges from 100 $cm^2$ to 180 $cm^2$ and more preferably ranges from 110 $cm^2$ to 150 $cm^2$.

There is no particular restriction on the material of the partition walls 1. For example, the material of the partition walls 1 preferably includes at least one selected from a group composed of silicon carbide, cordierite, a silicon-silicon carbide composite material, cordierite-silicon carbide composite material, silicon nitride, mullite, alumina, and aluminum titanate.

There is no particular restriction on the material of the plugging portions 5, either. For example, the same material as the material of the partition walls 1 described above can be used. In the plugging portions 5 also, the material of the central plugging portions 5b and the material of the circumferential plugging portions 5a may be different or the same.

(2) Manufacturing Method for the Honeycomb Filter

There is no particular restriction on the method for manufacturing the honeycomb filter in accordance with the present invention, and the following method, for example, may be used. First, a plastic kneaded material for producing the honeycomb structure is prepared. The kneaded material for producing the honeycomb structure can be prepared by adding an additive, such as a binder, a pore Milner, and water, as appropriate, to a material selected from among the foregoing suitable materials of the partition walls as raw material powder.

Subsequently, the kneaded material obtained as described above is subjected to extrusion thereby to obtain a pillar-shaped honeycomb formed body having partition walls that define a plurality of cells, and a circumferential wall provided, surrounding the partition walls. Then, the obtained honeycomb formed body is dried by, for example, microwave and hot air.

Subsequently, plugging portions are provided at the open ends of the cells of the dried honeycomb formed body. More specifically, for example, a plugging material that contains a raw material for forming the plugging portions is first prepared. Then, a mask is provided on the inflow end face of the honeycomb formed body to cover the inflow cells. Next, the plugging material that has been prepared is filled in the open ends of the outflow cells not provided with the mask on the inflow end face side of the honeycomb formed body. Thereafter, for the outflow end face of the honeycomb formed body also, the plugging material is filled in the open ends of the inflow cells by the same method described above.

In the manufacture of the honeycomb filter in accordance with the present invention, to provide the plugging portions, two types of plugging materials, namely, a central plugging material for forming central plugging portions and a circumferential plugging material for forming circumferential plugging portions, are prepared. For the central plugging material, the ratio of a pore forming raw material (e.g. pore former) is set to be low so as to set the porosity P1 of the central plugging portions to be relatively low. Further, for the circumferential plugging material, the ratio of a pore forming raw material (e.g. pore former) is set to be high so as to set the porosity P2 of the circumferential plugging portions to be relatively high. Then, the two types of plugging materials are properly used to plug the open ends of the cells in a predetermined area. More specifically, the central plugging material is used to fill the open ends of the cells in an area that will be the central region in the honeycomb formed body, and the circumferential plugging material is used to fill the open ends of the cells in an area that will be the circumferential region in the honeycomb formed body.

Subsequently, the honeycomb formed body with the plugging portions provided at the open ends of one side of the cells is fired to manufacture the honeycomb filter in accordance with the present invention. The firing temperature and the firing atmosphere vary according to a material, and a person skilled in the art can select a firing temperature and a firing atmosphere that are best suited for a selected material.

EXAMPLES

The following will describe the present invention further specifically by examples; however, the present invention is not limited at all by the examples.

Example 1

Ten parts by mass of a pore former, 20 parts by mass of a dispersing medium, and 1 part by mass of an organic binder were added to 100 parts by mass of a cordierite forming raw material and mixed, and the mixture was kneaded to prepare a kneaded material. As the cordierite forming raw material, alumina, aluminum hydroxide, kaolin, talc, and silica were used. As the dispersing medium, water was used. As the organic binder, methylcellulose was used. As a dispersing agent, dextrin was used. As the pore former, coke having an average particle diameter of 15 µm was used.

Subsequently, the kneaded material was subjected to extrusion using a die for making honeycomb formed bodies thereby to obtain a honeycomb formed body, the entire shape of which was a round pillar shape. The shape of the cells of the honeycomb formed body was quadrangular.

Subsequently, the honeycomb formed body was dried by a microwave drier, and further dried by a hot air drier to completely dry the honeycomb formed body. Thereafter, both end faces of the honeycomb formed body were cut to predetermined dimensions.

Subsequently, the plugging materials for forming the plugging portions were prepared. In Example 1, the two types of plugging materials, namely, the central plugging material for forming the central plugging portions and the circumferential plugging material for forming the circumferential plugging portions, were prepared. For the central plugging material, when preparing the plugging material, the ratio of the pore forming raw material was set to be relatively low in comparison with the circumferential plugging material. For the circumferential plugging material, the ratio of the pore forming raw material was set to be relatively high in comparison with the central plugging material when preparing the plugging material.

Subsequently, using the foregoing two types of plugging materials, the central plugging portions and the circumferential plugging portions were formed at the open ends of the cells on the inflow end face side of the dried honeycomb formed body. More specifically, first, a mask was provided on the inflow end face of the honeycomb formed body to cover the inflow cells. Then, either the central plugging material or the circumferential plugging material was filled in the open ends of the outflow cells not provided with the mask, thereby forming the central plugging portions and the circumferential plugging portions. More specifically, the open ends of the cells in the area that will be the central region were filled with the central plugging material, and the open ends of the cells in the area that will be the circumferential region were filled with the circumferential plugging material.

Subsequently, the outflow end face of the honeycomb formed body was also provided with a mask to cover the outflow cells. Then, either the central plugging material or the circumferential plugging material was filled in the open ends of the inflow cells not provided with the mask, thereby forming the central plugging portions and the circumferential plugging portions.

Subsequently, the honeycomb formed body in which the plugging portions had been formed was degreased and fired thereby to manufacture the honeycomb filter of Example 1.

The honeycomb filter of Example 1 was round pillar-shaped, and the shapes of the inflow end face and the outflow end face thereof were circular. The diameters of the inflow end face and the outflow end face were 118 mm. Further, the extending-direction length of the cells of the honeycomb filter was 127 mm. In the honeycomb filter of Example 1, the thickness of the partition walls was 0.22 mm, the porosity P3 of the partition walls was 55%, and the cell density was 31 cells/cm$^2$. Table 1 shows the thickness of the partition walls, the porosity P3 of the partition walls, and the cell density of the honeycomb filter. The porosity P3 of the partition walls was measured by using Micromeritics' AutoPore 9500 (trade name).

The honeycomb filter of Example 1 was configured such that the porosity P1 of the central plugging portions, which were the plugging portions existing in the central region, was lower than the porosity P2 of the circumferential plugging portions, which were the plugging portions existing in the circumferential region. The porosity P1 of the central plugging portions ranged from 66% to 68%, and the porosity P2 of the circumferential plugging portions ranged from 78% to 80%. The porosity P1 of the central plugging portions and the porosity P2 of the circumferential plugging portions were calculated as follows. After processing to remove only the plugging portions, the masses of the plugging portions were measured, and the porosity P1 and the porosity P2 were calculated from the measured masses and the true density of the plugging materials. In the honeycomb filter of Example 1, the area ratio, which is the ratio of the area S2 of the circumferential region with respect to the area S1 of the central region (S2/S1), was 0.19. The results are shown in the column of "Area ratio between central region and circumferential region (S2/S1)" of Table 1. In Table 1, the columns of "Porosity P1 (max.) (%)" and "Porosity P1 (min.) (%)" of "Central plugging portion" show the maximum value and the minimum value obtained when the porosity P1 differs in the central plugging portions of the central region. Further, in Table 1, the columns of "Porosity P2 (max.) (%)" and "Porosity P2 (min.) (%)" of "Circumferential plugging portion" show the maximum value and the minimum value obtained when the porosity P2 differs in the circumferential plugging portions of the circumferential region. If the porosity of the central plugging portions and the porosity of the circumferential plugging portions in the regions are constant, then the values in the columns will be the same.

TABLE 1

| | Honeycomb structure | | | Area ratio between central region and circumferential region (S2/S1) | Central plugging portion | | Circumferential plugging portion | |
|---|---|---|---|---|---|---|---|---|
| | Thickness of partition wall (mm) | Porosity P3 of partition wall (%) | Cell density (cells/cm$^2$) | | Porosity P1 (max.) (%) | Porosity P1 (min.) (%) | Porosity P2 (max.) (%) | Porosity P2 (min.) (%) |
| Example 1 | 0.22 | 55 | 31 | 0.19 | 68 | 66 | 80 | 78 |
| Example 2 | 0.22 | 57 | 31 | 0.39 | 63 | 61 | 73 | 71 |
| Example 3 | 0.22 | 63 | 47 | 0.41 | 62 | 60 | 82 | 80 |
| Example 4 | 0.22 | 61 | 47 | 0.17 | 68 | 66 | 82 | 80 |
| Example 5 | 0.2 | 60 | 47 | 0.41 | 62 | 60 | 82 | 80 |
| Example 6 | 0.24 | 64 | 47 | 0.17 | 68 | 66 | 82 | 80 |
| Example 7 | 0.165 | 46 | 34 | 0.27 | 62 | 60 | 82 | 80 |
| Example 8 | 0.178 | 46 | 34 | 0.18 | 64 | 66 | 72 | 70 |
| Comparative example 1 | 0.22 | 63 | 47 | — | 76 | 74 | 76 | 74 |
| Comparative example 2 | 0.22 | 55 | 31 | — | 70 | 68 | 70 | 68 |
| Comparative example 3 | 0.15 | 48 | 34 | — | 72 | 70 | 72 | 70 |
| Comparative | 0.22 | 55 | 31 | 0.29 | 61 | 60 | 68 | 67 |

TABLE 1-continued

|  | Honeycomb structure | | | Area ratio between central region and circumferential region (S2/S1) | Central plugging portion | | Circumferential plugging portion | |
| --- | --- | --- | --- | --- | --- | --- | --- | --- |
|  | Thickness of partition wall (mm) | Porosity P3 of partition wall (%) | Cell density (cells/cm²) |  | Porosity P1 (max.) (%) | Porosity P1 (min.) (%) | Porosity P2 (max.) (%) | Porosity P2 (min.) (%) |
| example 4 Comparative example 5 | 0.15 | 48 | 34 | 0.18 | 59 | 58 | 86 | 85 |

On the honeycomb filter of Example 1, the "Evaluation of falling off of the plugging portion", the "Evaluation of erosion resistance", and the "Evaluation of thermal shock resistance" were carried out according to the following method. Table 2 shows the results.

[Evaluation of Falling Off of the Plugging Portions]

The side surface of the honeycomb filter of each example was wrapped with a mat according to the following method, and the honeycomb filter wrapped with the mat was pushed into a can body to support the honeycomb filter by the can body. When wrapping the mat, an edge of the mat was positioned at 5 mm on the inner side from an end face of the honeycomb structure constituting the honeycomb filter, and the entire side surface of the honeycomb filter was covered with the mat. The honeycomb filter was held such that the degree of compression, i.e. the gap bulk density (GBD), of the mat at that time was 0.45 g/cm³, and the occurrence of the falling off of the plugging portions from the cells was checked.

Evaluation "OK": If the falling off of the plugging portions does not occur in the honeycomb filter to be evaluated, then the evaluation result is denoted by "OK."

Evaluation "NG": If the falling off of the plugging portions occurs in the honeycomb filter to be evaluated, then the evaluation result is denoted by "NG."

[Evaluation of Erosion Resistance]

First, a honeycomb filter was canned (housed) in a can body, and the canned honeycomb filter was placed on a gas burner tester. Then, SiC abrasive grain was collided with the inflow end face of the honeycomb filter by the gas burner tester. The conditions under which the abrasive grain was collided were as follows. The amount of supplied grain was 5 grams. The temperature of the gas to be passed into the honeycomb filter was 700° C. The flow rate of the gas to be passed into the honeycomb filter was 120 m/sec. The testing time was 10 minutes, during which the abrasive grain was supplied little by little. Thereafter, the honeycomb filter was taken out, and the honeycomb filter that was taken out was photographed by computed tomography (CT) to calculate the scraping depth in the honeycomb filter caused by the collision of the abrasive grain (an erosion depth (mm)). In the measurement test of the erosion amount, abrasive grain having an average particle diameter of 50 µm was used. The erosion resistance of the honeycomb filter was evaluated according to the following evaluation standards. Among Examples 1 to 8 and Comparative Examples 1 to 3, Comparative Example 1 was defined as the reference honeycomb filter. The term "the penetration of plugging" means that the plugging portions are scraped by erosion and at least some of the plugging portions are penetrated in the direction in which the gas flowed.

Evaluation "Excellent": When the erosion depth of the reference honeycomb filter is defined as 100%, if the erosion depth of the honeycomb filter to be evaluated is below 20%, then the honeycomb filter is evaluated as "Excellent."

Evaluation "Good": When the erosion depth of the reference honeycomb filter is defined as 100%, if the erosion depth of the honeycomb filter to be evaluated is 20% or more and below 50%, then the honeycomb filter is evaluated as "Good."

Evaluation "Acceptable": When the erosion depth of the reference honeycomb filter is defined as 100%, if the erosion depth of the honeycomb filter to be evaluated is 50% or more and below 80%, then the honeycomb filter is evaluated as "Acceptable."

Evaluation "NG": When the erosion depth of the reference honeycomb filter is defined as 100%, if the erosion depth of the honeycomb filter to be evaluated is 80% or more, then the honeycomb filter is evaluated as "NG."

[Evaluation of Thermal Shock Resistance]

First, a predetermined amount of soot was generated under a certain operating condition in an engine bench provided with a 1.4-L gasoline engine, then the generated soot was accumulated on the surfaces of the partition walls of the honeycomb filter of each example and each comparative example. Next, regeneration processing by post-injection was carried out, the inlet gas temperature of the honeycomb filter was increased, the post-injection was cut off when the pressure loss before and after the honeycomb filter started to decrease, and the engine was switched to an idling mode. The accumulation amount of the soot in the predetermined amount before the regeneration processing was gradually increased, and the foregoing operation was repeatedly performed until the honeycomb filter cracked. The accumulation amount of the soot that caused a crack in the honeycomb filter was defined as "the soot accumulation limit amount" in each honeycomb filter. The soot accumulation limit amount of each honeycomb filter was evaluated according to the following evaluation standards. Among Examples 1 to 8 and Comparative Examples 1 to 3, Comparative Example 1 was defined as the reference honeycomb filter.

Evaluation "Excellent": When the soot accumulation limit amount of the reference honeycomb filter is defined as 100%, if the soot accumulation limit amount of the honeycomb filter to be evaluated is 130% or more, then the honeycomb filter is evaluated as "Excellent."

Evaluation "Good": When the soot accumulation limit amount of the reference honeycomb filter is defined as 100%, if the soot accumulation limit amount of the honeycomb filter to be evaluated is 120% or more and below 130%, then the honeycomb filter is evaluated as "Good."

Evaluation "Acceptable": When the soot accumulation limit amount of the reference honeycomb filter is defined as 100%, if the soot accumulation limit amount of the honeycomb filter to be evaluated is 100% or more and below 120%, then the honeycomb filter is evaluated as "Acceptable."

Evaluation "Fail": When the soot accumulation limit amount of the reference honeycomb filter is defined as 100%, if the soot accumulation limit amount of the honeycomb filter to be evaluated is below 100%, then the honeycomb filter is evaluated as "Fail."

Examples 2 to 8

Honeycomb filters were manufactured according to the same method as that used for the honeycomb filter of Example 1 except that the configurations of the honeycomb filters were changed as shown in Table 1. In Examples 2 to 8, the porosity P1 of the central plugging portions and the porosity P2 of the circumferential plugging portions were changed by changing the amount of a foamable resin when preparing a plugging material.

Comparative Examples 1 to 5

Honeycomb filters were manufactured according to the same method as that used for the honeycomb filter of Example 1 except that the configurations of the honeycomb filters were changed as shown in Table 1. In Comparative Examples 1 to 5, the porosity P1 of the central plugging portions and the porosity P2 of the circumferential plugging portions were changed by changing the amount of a foamable resin when preparing a plugging material.

On the honeycomb filters of Examples 2 to 8 and Comparative Examples 1 to 5 also, the "Evaluation of falling off of the plugging portion", the "Evaluation of erosion resistance", and the "Evaluation of thermal shock resistance" were carried out according to the same method as that used for Example 1. Table 2 shows the results.

TABLE 2

|  | Evaluation of falling off of plugging portion | Evaluation of erosion resistance | Evaluation of thermal shock resistance |
| --- | --- | --- | --- |
| Example 1 | OK | Acceptable | Excellent |
| Example 2 | OK | Good | Acceptable |
| Example 3 | OK | Excellent | Acceptable |
| Example 4 | OK | Good | Excellent |
| Example 5 | OK | Excellent | Good |
| Example 6 | OK | Acceptable | Excellent |
| Example 7 | OK | Excellent | Excellent |
| Example 8 | OK | Good | Excellent |
| Comparative example 1 | NG | Reference | Reference |
| Comparative example 2 | NG | Acceptable | Good |
| Comparative example 3 | OK | Acceptable | Fail |
| Comparative example 4 | NG | Excellent | Excellent |
| Comparative example 5 | OK | Excellent | Fail |

(Results)

It was found that the honeycomb filters of Examples 1 to 8 exhibit high erosion resistance and enable the thermal shock resistance to be improved while preventing the plugging portions from falling off from the cells at the time of canning. On the other hand, it was found that the honeycomb filter of Comparative Example 1 exhibits small effect for any of the falling off of the plugging portions from the cells, the erosion resistance, and the thermal shock resistance, as compared with the honeycomb filters of Examples 1 to 8. There was a tendency for the erosion resistance and the thermal shock resistance to be improved by controlling the porosity of the plugging portions in the central region to be low, and the falling off of the plugging portions from the cells could be suppressed by setting the porosity of the plugging portions in the circumferential region at a higher value. Further it was found that, if the absolute value of the porosity of the plugging portions in the circumferential region is excessively small, as with the honeycomb filter of Comparative Example 4, then a sufficient effect for suppressing the falling off of the plugging portions cannot be obtained. Further, it was found that, if the absolute value of the porosity of the plugging portions in the central region is excessively small, as with the honeycomb filter of Comparative Example 5, then the thermal shock resistance deteriorates.

INDUSTRIAL APPLICABILITY

The honeycomb filter in accordance with the present invention can be used as a filter for trapping particulate matter in an exhaust gas.

DESCRIPTION OF REFERENCE NUMERALS

1: partition wall; 2: cell; 2a: inflow cell; 2b: outflow cell; 3: circumferential wall; 5: plugging portion; 5a: circumferential plugging portion; 5b: central plugging portion; 10: honeycomb structure; 11: inflow end face; 12: outflow end face; 15: central region; 16: circumferential region; and 100, 200: honeycomb filter.

What is claimed is:

1. A honeycomb filter comprising:
   a pillar-shaped honeycomb structure having porous partition walls provided, surrounding a plurality of cells which serve as fluid through channels extending from an inflow end face to an outflow end face; and
   porous plugging portions provided either at an end on the inflow end face or at an end on the outflow end face, wherein the plugging portions are composed of a porous material,
   the honeycomb structure has a central region that includes a center of gravity in a section orthogonal to a direction in which the plurality of cells extend, and a circumferential region on a farther circumferential side from the central region, and has S2/S1, which denotes a ratio of an area S2 of the circumferential region with respect to an area S1 of the central region, ranging from 0.1 to 0.5,
   porosity P1 of central plugging portions, which are the plugging portions existing in the central region, is lower than porosity P2 of circumferential plugging portions, which are the plugging portions existing in the circumferential region,
   the porosity P1 of the central plugging portions ranges from 60% to 68%, and the porosity P2 of the circumferential plugging portions ranges from 70% to 85%,
   the central plugging portions and the circumferential plugging portions are arranged from a center toward a circumference in a radial direction of the section orthogonal to the direction in which the plurality of cells extend, and
   the central plugging portions and the circumferential plugging portions are configured such that the porosity of each of the central plugging portions and the circumferential plugging portions, which are arranged in order toward the circumference, increase in steps from the central plugging portions provided closer to a central side in the radial direction of the section orthogonal to the direction in which the plurality of cells extend.

2. The honeycomb filter according to claim 1, wherein a cell structure of the honeycomb structure is the same in the central region and the circumferential region.

3. The honeycomb filter according to claim 1, wherein a porosity of the porous partition walls ranges from 40% to 70%.

4. The honeycomb filter according to claim 1, wherein an absolute value of a difference between a minimum porosity and a maximum porosity of the porous partition walls of the honeycomb structure is 5% or less.

5. The honeycomb filter according to claim 1, wherein a porosity of the porous partition walls is constant in the entire honeycomb structure.

6. A honeycomb filter comprising:
- a pillar-shaped honeycomb structure having porous partition walls provided, surrounding a plurality of cells which serve as fluid through channels extending from an inflow end face to an outflow end face; and
- porous plugging portions provided either at an end on the inflow end face or at an end on the outflow end face,
- wherein the plugging portions are composed of a porous material,
- the honeycomb structure has a central region that includes a center of gravity in a section orthogonal to a direction in which the plurality of cells extend, and a circumferential region on a farther circumferential side from the central region, and has S2/S1, which denotes a ratio of an area S2 of the circumferential region with respect to an area S1 of the central region, ranging from 0.1 to 0.5,
- porosity P1 of a central plugging portion, which is a plugging portion of the porous plugging portions existing in the central region, is lower than porosity P2 of a circumferential plugging portion, which is a plugging portion of the porous plugging portions existing in the circumferential region,
- the porosity P1 of the central plugging portion ranges from 60% to 68%, and the porosity P2 of the circumferential plugging portion ranges from 70% to 85%, and
- an absolute value of a difference between a minimum porosity and a maximum porosity of the porous partition walls of the honeycomb structure is 5% or less.

7. The honeycomb filter according to claim 6, wherein a cell structure of the honeycomb structure is the same in the central region and the circumferential region.

8. The honeycomb filter according to claim 6, wherein a porosity of the porous partition walls ranges from 40% to 70%.

9. The honeycomb filter according to claim 6, wherein a porosity of the porous partition walls is constant in the entire honeycomb structure.

* * * * *